(12) United States Patent
Unger

(10) Patent No.: US 7,100,194 B1
(45) Date of Patent: Aug. 29, 2006

(54) METHOD AND SYSTEM FOR MINIMIZING THE TIME REQUIRED TO ACQUIRE A CONTROL CHANNEL OF A CABLE TELEVISION SIGNAL WITH A SET-TOP UNIT

(75) Inventor: Robert Allan Unger, ElCajon, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1176 days.

(21) Appl. No.: 09/711,325

(22) Filed: Nov. 13, 2000

(51) Int. Cl.
*H04N 7/16* (2006.01)
*H04N 7/173* (2006.01)

(52) U.S. Cl. ............. 725/151; 725/131; 725/139

(58) Field of Classification Search ........ 725/131–134, 725/151–153, 139–142, 110, 116
See application file for complete search history.

(56) References Cited

U.S. PATENT DOCUMENTS

| | | | | |
|---|---|---|---|---|
| 5,093,921 A * | 3/1992 | Bevins, Jr. | ............. | 725/152 |
| 5,220,580 A * | 6/1993 | Heberle et al. | ............. | 375/142 |
| 5,440,632 A * | 8/1995 | Bacon et al. | ............. | 380/242 |
| 5,649,285 A * | 7/1997 | Cautley | ............. | 725/138 |
| 5,734,589 A * | 3/1998 | Kostreski et al. | ............. | 345/716 |
| 5,761,602 A * | 6/1998 | Wagner et al. | ............. | 725/34 |
| 5,805,230 A * | 9/1998 | Staron | ............. | 348/460 |
| 5,883,901 A * | 3/1999 | Chiu et al. | ............. | 370/508 |
| 6,357,046 B1 * | 3/2002 | Thompson et al. | ............. | 725/139 |
| 6,425,133 B1 * | 7/2002 | Leary | ............. | 725/132 |
| 6,574,796 B1 * | 6/2003 | Roeck et al. | ............. | 725/111 |
| 6,583,825 B1 * | 6/2003 | Yuen et al. | ............. | 348/731 |
| 6,807,676 B1 * | 10/2004 | Robbins et al. | ............. | 725/39 |
| 2002/0035728 A1 * | 3/2002 | Fries | ............. | 725/68 |
| 2002/0104097 A1 * | 8/2002 | Jerding et al. | ............. | 725/115 |
| 2002/0116706 A1 * | 8/2002 | Bahraini | ............. | 725/32 |

* cited by examiner

*Primary Examiner*—Chris Kelley
*Assistant Examiner*—Joseph G. Ustaris
(74) *Attorney, Agent, or Firm*—Steven L. Nichols; Rader, Fishman & Grauer PLLC (57) ABSTRACT

A set-top unit for processing a cable signal from a cable television system for use on a television, where the set-top unit includes one or more programming tuners in addition to a control tuner, can reduce the time required to locate the cable system's control channel by having all available tuners, the control tuner and programming tuner(s), search the band of possible frequencies of the control channel simultaneously. The band of frequencies is divided among the available tuners in the set-top unit, with each tuner searching an assigned portion of the band for a control channel. With multiple tuners searching for the control channel(s), the time required to acquire the control channel is minimized.

23 Claims, 4 Drawing Sheets

METHOD AND SYSTEM FOR MINIMIZING THE TIME REQUIRED TO ACQUIRE A CONTROL CHANNEL OF A CABLE TELEVISION SIGNAL WITH A SET-TOP UNIT

FIELD OF THE INVENTION

The present invention relates to the field of cable television systems. More particularly, the present invention relates to a method and system for enabling set-top units, when connected to the cable television system, to acquire the control channel required to allow the set-top unit to operate within the cable system in a minimal amount of time.

BACKGROUND OF THE INVENTION

In a typical cable television system, each subscriber is provided with a set-top unit, also called a set-top box or set-top terminal. The set-top unit is a piece of electronic equipment that is used to connect the subscriber's television, and potentially other electronic equipment, to the cable network. The set-top unit is usually connected to the cable network through a co-axial wall outlet.

The set-top unit is essentially a computer that is programmed to process the signals from the cable network so as to provide the subscriber with the services of the cable system. These services from the cable television company typically include access to a number of television channels and, perhaps, an electronic program guide. Additionally, premium channels may also be provided to subscribers for an additional fee. Other video programming services such as pay-per-view events and video-on-demand may also be provided over the cable network. The set-top box is programmed to provide these and all the other services of the cable system to the subscriber.

However, the services of the cable system are not necessarily limited to providing television programming. Some cable companies now offer internet access and e-mail over their cable networks at speeds much faster than are available over conventional telephone lines. Some cable companies also offer telephone service. It is anticipated in the future that more and more data services will be provided over the cable network. Eventually, each home or office may have a single connection, via the cable network, to all electronic data services.

When a new set-top unit is connected to the cable network, it must be initialized. To initialize a set-top unit, the unit must be provided with the programming required to allow it to function within the specific cable system to which it is connected and to thereby provide the services for which the subscriber has paid. Each cable system, built and managed by different cable system operators, may be set-up and function differently than other cable systems. Consequently, initializing a set-top unit includes physically connecting the set-top unit to the cable system so that the unit receives the signal from the cable system and programming the set-top unit to identify and tune a control channel within the signal from the cable system.

The control channel is a piece of broadband signal used for supervisory services. Specifically, the control channel is used to provide the set-top unit with instructions and data sent by the cable system operator. Without the data from the control channel, the set-top unit will be unable to make appropriate use of the signal from the cable system, e.g., recognize television programming on the in-band channels of the composite signal from the cable system. The headend is the facility from which the cable system operator broadcasts the control channel and television signals and provides other services over the cable system.

The frequency for the control channel could be programmed into the set-top unit during manufacture. However, different cable systems will likely use different frequencies to transmit their control channel. If more than one control channel is used, the configuration of control channels is even more likely to vary from system to system. Consequently, each set-top unit must be able, when connected to the cable system, to dynamically locate the control channel or channels so as to receive the necessary information required to allow the set-top unit to operate with that particular cable system.

Typical set-top units have a control channel tuner which is used to tune the control channel from within the composite signal received over the cable television system. The data of the control channel is the provided by the control channel tuner to the set-top unit's circuitry. Conventionally, in order to locate a control channel when a new set-top unit is first connected to a cable system, the control channel tuner in the set-top unit scans through the entire frequency band that might contain the control channel(s) until the control channel(s) is located. This involves a brute force search which requires stopping and testing each possible frequency.

Consequently, this search for the control channel requires a period of time during which the set-top unit cannot be used to watch television or provide any other services of the cable system to a subscriber. Consequently, there is a need in the art for an improved method and system of locating the control channel of a cable television system so as to minimize the time the set-top unit must spend searching for the control channel during which time other functions of the set-top unit are not available.

SUMMARY OF THE INVENTION

The present invention provides an improved method and system of locating the control channel of a cable television system so as to minimize the time the set-top unit must spend searching for the control channel and failing to provide any other functionality. Consequently, the present invention provides a set-top unit better able to respond to the needs of its users.

The present invention may be embodied and described as a set-top unit for connection to a cable television system that includes a control channel tuner; at least one programming tuner; and a processor for controlling the tuners. In addition to controlling the control channel tuner, the processor controls the programming tuner or tuners to scan a relevant frequency band to help locate the control channel required by the set-top unit to achieve full functionality with the cable system.

There are a number of ways in which the processor may use the programming tuner or tuners to more quickly acquire the control channel. For example, the processor may control the tuner(s) to tune frequencies in the frequency band and identify frequencies carrying an active signal. The processor then controls the control channel tuner to tune the frequencies carrying an active signal to locate the control channel. If the control channel is not found at one of the frequencies carrying an active signal, the processor may then drive the control channel tuner to tune frequencies in the relevant frequency band until the control channel is located.

Preferably, the set-top unit includes two or more programming tuners. The processor may then divide the frequency band between the two programming tuners and control the two programming tuners to tune frequencies in different portions of the frequency band to identify frequencies carrying an active signal. Signal strength at a frequency may be used to identify possible control channel frequencies. Consequently, the relevant frequency band can be scanned for active signals that might be the control channel more quickly with multiple programming tuners.

Alternatively, the processor may divides the frequency band among the both control channel tuner and the programming tuner or tuners. The processor then controls each tuner to search a different portion of the frequency band for the control channel. Each tuner identifies possible control channels, based on, for example, signal strength, to the processor. The processor can then verify whether the signal is the control channel.

Again, it is preferably for the set-top unit to contain two or more programming tuners. Similar to the embodiment described above, the processor can then divide the frequency band among the control channel tuner and the first and second programming tuners, and control each the tuner to search a different portion of the frequency band for the control channel. Again, the relevant frequency band is obviously searched more quickly with multiple tuners, including both the control channel and programming tuners.

The set-top unit preferably also includes a memory unit in which the processor may store data. The processor may, before controlling the programming tuner or tuners to scan the relevant frequency band to locate the control channel, may check the memory unit for a last known frequency at which the control channel was broadcast. If such a frequency is recorded and the control channel is broadcast at that frequency, the control channel can be acquired very quickly.

The present invention also encompasses the underlying methods of constructing and operating the system described above. Specifically, the present invention encompasses a method for acquiring a control channel of a cable television system with a set-top unit connected to the cable television system by controlling at least one programming tuner of the set-top unit to scan a frequency band to locate the control channel. The present invention also encompasses the computer-readable instructions required to cause the processor of the set-top unit to operate in the manner described above.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
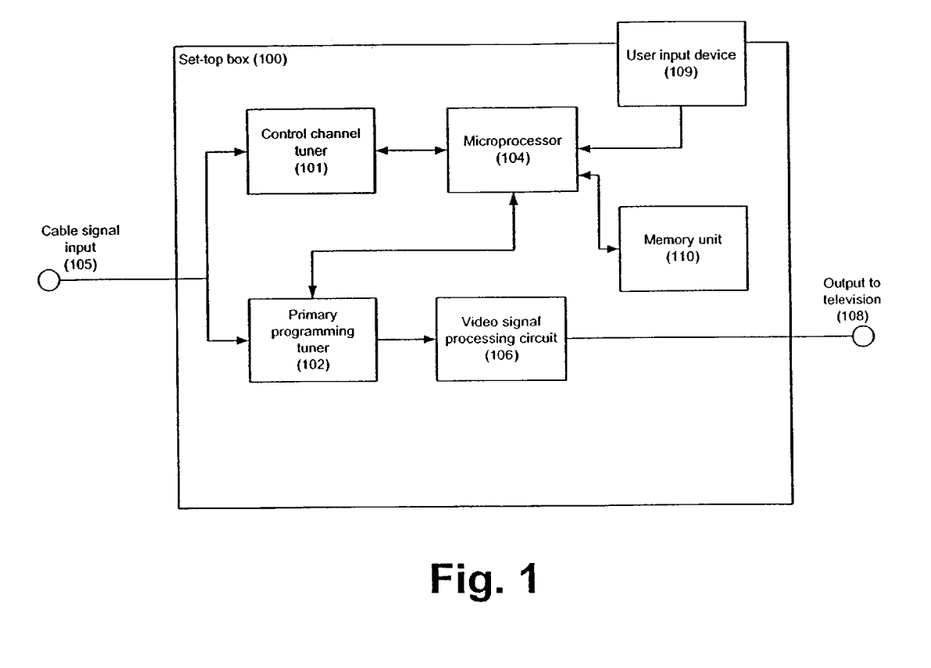
FIG. 1 is a block diagram of a set-top unit according to a preferred embodiment of the present invention.

FIG. 1 illustrates a set-top unit (100) as a preferred embodiment of the present invention. As shown in FIG. 1, the set-top unit (100) receives a broadband signal (105) from the cable television system, typically through a co-axial wall outlet. The signal (105) includes a number of television channels as well as one or more control channels on which data and instructions necessary to the proper operation of the set-top unit (100) with the cable system are broadcast. Without the data from the control channel, the set-top unit (100) will be unable to recognize the programming on the "in-band" channels of the composite signal (105).

During normal operation, the set-top unit (100) receives the composite cable signal (105). A programming or in-band tuner (e.g., 102) tunes and locks to the channel desired by the user from among the various channels included in the composite signal (105). The signal for the channel desired by the user is then sent through a video signal processing circuit (106) and output to a television set or monitor (108) where it can be viewed by the user.

A user input device (109) provides commands from the user to a microprocessor (104). The processor (104) executes the programming for running and managing the set-top box (100). The user input device (109) may include, for example, a wireless remote control unit that communicates with a receiver in the set-top unit (100). Additionally, the user input device (109) may include a keypad or any other input device located on the housing of the set-top unit (100).

Through the user input device, the user indicates which channel from the composite signal (105) that the set-top unit (100) should tune. This input is received by the processor (104) which controls the primary tuner (102) accordingly.

However, when the set-top unit (100) is first connected to the cable signal (105), the tuner (102) cannot be used to tune a channel desired by the user until the control channel tuner (101) under the direction of the processor (104) has located the control channel(s) for that cable network and the processor (104) has received, via the control channel, the data required to allow the set-top unit (100) to function with the cable system.

The control channel is typically modulated with a different type of modulation than channels carrying television programming. Consequently, the control tuner (101) may demodulate an incoming signal differently than the programming tuner (102).

As noted above, conventionally, the processor (104) executes an algorithm to locate the control channel(s). The processor (104) causes the control channel tuner (101) to successively tune various frequencies in a particular frequency band at which a control channel might be broadcast. This trial-and-error method continues until the control channel is located, tuned and locked.

Under the principles of the present invention, the otherwise idle primary tuner (102) is used to minimize the time required to locate the control channel. When the set-top unit (100) must acquire the control channel, the processor (104) controls both the control channel tuner (101) and the primary tuner (102) to search the available frequency band for the control channel. With two tuners searching the frequency band, the control channel should be identified more quickly.

Each tuner (101, 102), under the control of the processor (104), samples the data signal, if any, at each frequency tuned. If the programming tuner (102) can demodulate the control channel, i.e., the demodulation hardware of the programming tuner (102) is compatible with the type of modulation used to broadcast the control channel, the programming tuner (102) will provide the sampled signal to the processor (104).

The processor (104) can then determine if the signal provided is that of a control channel. The processor (104), being in control of the frequencies successively tuned by the tuners (101, 102), already has the frequency associated with each signal sampling provided by the tuners (101, 102). Once either tuner has located a control channel, the processor (104) controls the control channel tuner (101) to tune and lock to the frequency of that control channel so that the set-top unit (100) can verify the control channel and provide full service to the user.

There are a number of equivalent search patterns for the tuners (101, 102) to cover the frequency band within which the control channel will be found. For example, one tuner (101 or 102) may begin checking frequencies at one end of the band, the other tuner starting at the other end of the band, both checking frequencies closer and closer to the center of the band until the control channel is found. Alternatively, one tuner may start at one end of the band and check frequencies toward the center of the band, while the other tuner starts at the middle of the band and checks frequencies toward the other end of the band. Any scheme for dividing the applicable frequency band between the two tuners is within the scope of the present invention.

Once the control channel has been found, the frequency of the control channel may be stored by the processor (104) in a memory unit (110). Then, the next time the set-top unit (100) needs to acquire the control channel, the last known frequency of the control channel can be retrieved from the memory unit (110). The control channel tuner (101) is then tuned to that frequency under the control of the processor (104). If the control channel is still being broadcast at that frequency, the control channel is thus very quickly acquired.

Figure 2:
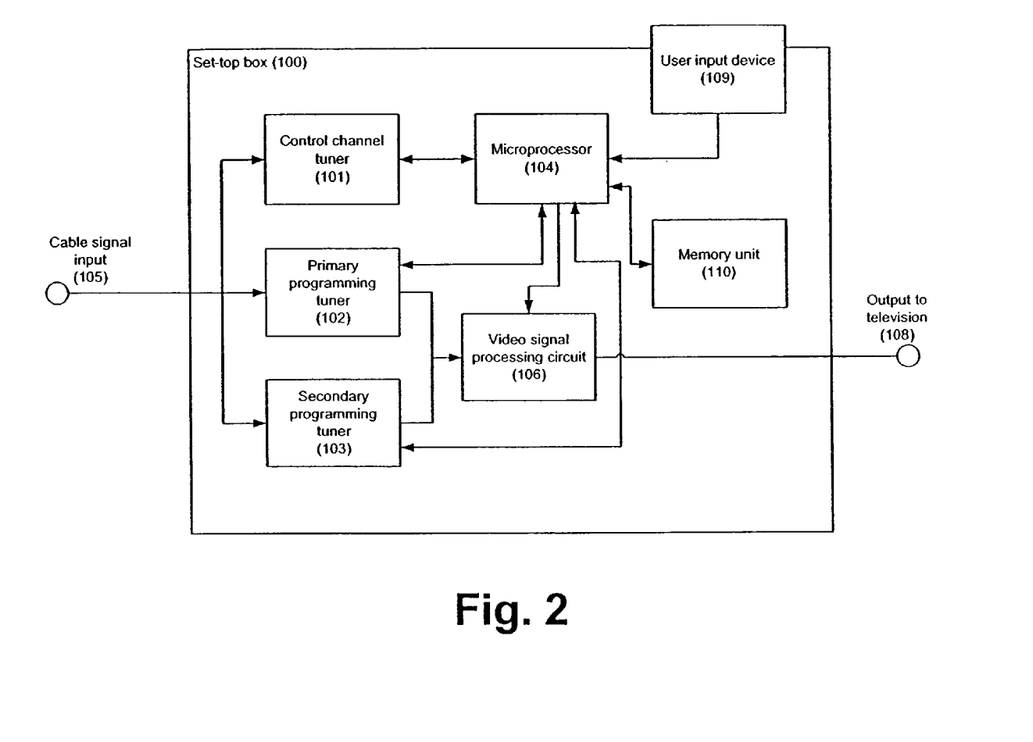
FIG. 2 is a block diagram of a set-top unit according to a second preferred embodiment of the present invention.

FIG. 2 illustrates a set-top unit according to a second preferred embodiment of the present invention. As shown in FIG. 1, the set-top unit (100) may include a secondary tuner (103) in addition to the control channel tuner (101) and the primary tuner (102).

The secondary tuner (103) may be provided for a number of reasons. For example, if the set-top unit (100) is designed to provide a picture-in-picture feature in which the user can display and watch two separate channels at once, or watch one channel while recording another, the secondary tuner (103) may be provided to tune the second channel in addition to the primary channel tuned by the primary tuner (102). Additionally, the primary tuner (102) may be designed to tune analog channel signals, while the secondary tuner (103) may be designed to tune digitally-modulated channels signals. Some cable composite signals (105) include both analog and digitally-modulated channels.

Both the primary (102) and secondary (103) tuners are programming tuners. As used herein, a programming tuner is a tuner other than the control channel tuner (101) which can be used during normal operation to tune a channel carrying video programming from among the signals carried by the composite signal (105), e.g., the primary (102) and secondary (103) tuners. A programming tuner can tune both "in-band" frequencies that typically carry video programming as well as out-of-band frequencies during the search for the control channel.

With the presence of the secondary tuner (103), the principles of the present invention can be further applied to limit the time required to acquire the control channel. Specifically, all three tuners (101–103) are used simultaneously to search the applicable frequency band for the control channel.

For example, the frequency band in which the control channel will be found may be divided into a number of equal segments that is equal to the number of tuners available in the set-top unit (100). This number of tuners may be three, as in the example illustrated in FIG. 2, or more. Each of the tuners (101–103) is then used to scan one of the segments of the applicable frequency band so that the entire band can be searched in the manner described above and the control channel acquired in less time. Again, any scheme for dividing and scanning the applicable frequency band among and with the available tuners is within the scope of the present invention.

Figure 3:
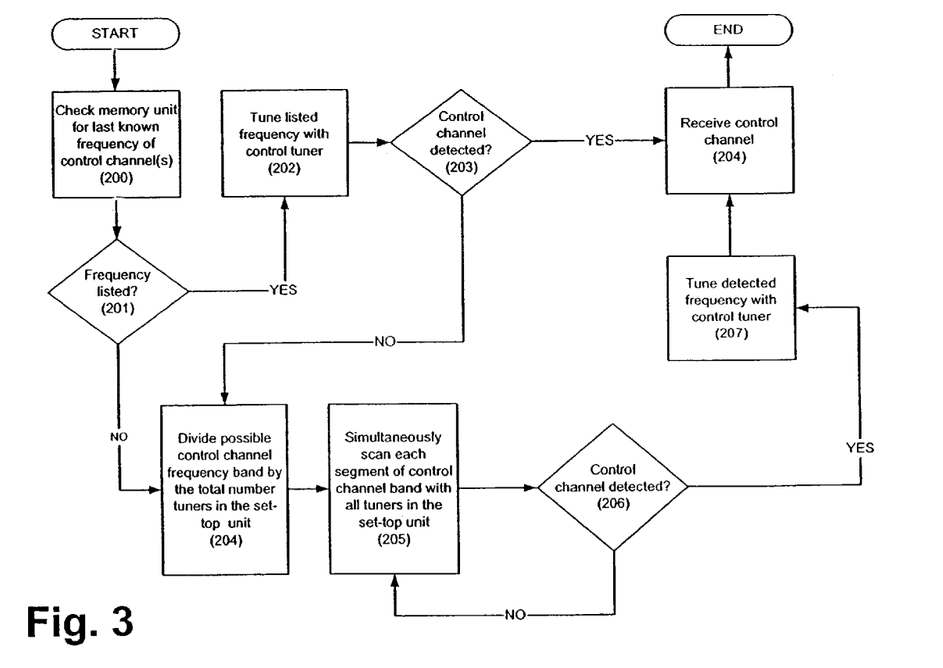
FIG. 3 is a flowchart illustrating a preferred method of the present invention.

FIG. 3 is a flowchart illustrating a preferred method of the present invention. As shown in FIG. 3, when the set-top terminal must acquire the control channel(s), the memory unit is checked to determine whether a last known frequency for the control channel has been recorded (200). If a frequency is listed (201), the processor controls the control channel tuner to tune that frequency (202). The processor then determines if the control channel is, in fact, broadcast at that frequency (203). If so, the processor receives the control channel via the control channel tuner (208), and the set-top unit attains full functionality.

If the listed last-known frequency of the control channel does not still carry the control channel or if no last-known frequency of the control channel is stored in memory, the set-top unit must locate the control channel. As described above, the band of frequencies where the control channel could possibly be located is divided among the tuners in the set-top unit (204). Each tuner, controlled by the processor, begins scanning a segment of the frequency band to be searched (205).

Each tuner tunes the various frequencies in its allotted segment of the frequency band to be searched. If a signal is received, notification is provided to the processor which determines if the signal is that of the control channel (206). With two or more tuners searching the frequency band, the control channel is identified more quickly than if only the control channel tuner were use to search the relevant frequency band.

When the control channel is finally located, the processor tunes the control channel with the control channel tuner (207). The processor then receives the data of the control channel through the control channel tuner (208), and the set-top unit achieves full functionality.

Figure 4:
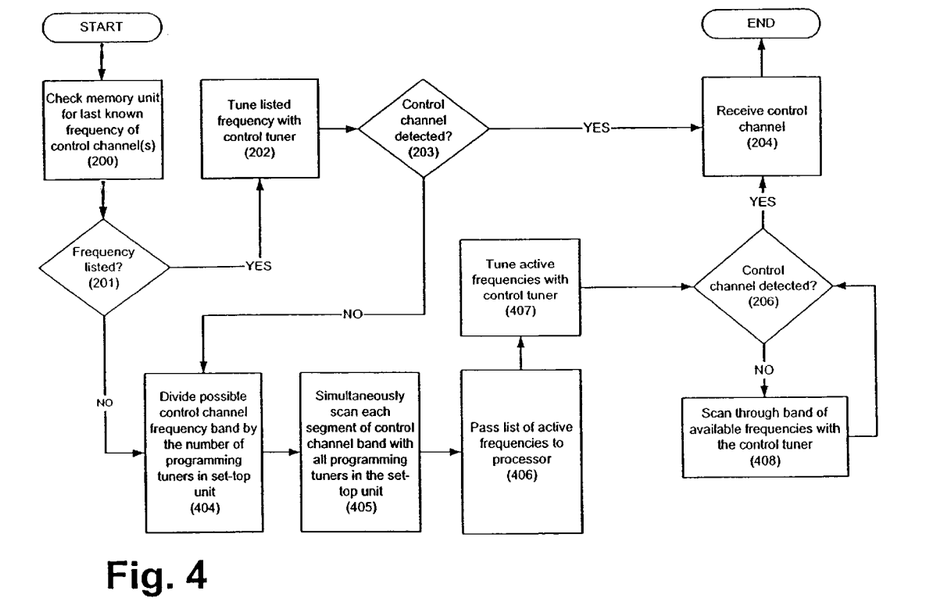
FIG. 4 is a flowchart illustrating a second preferred method of the present invention.

FIG. 4 illustrates an alternative method, a second preferred method of the present invention, for minimizing the time required to locate the control channel in the composite cable system signal. As shown in FIG. 4 and as explained above, the processor will first check the set-top unit's memory for a last known carrier frequency for the control channel (200) and will tune that frequency (202) if such a frequency is stored in memory (201). If the control channel is detected (203) at the stored frequency, the processor receives the control channel (208), and the set-top unit achieves full functionality.

If a last known frequency for the control channel is not stored in memory (201), or the frequency stored does not still carry the control channel (203), the set-top unit must locate the control channel empirically. The frequency band to be searched is divided by the number of programming tuners available in the set-top unit (404). This is different than the approach taken above in which a segment of the frequency band to be searched was assigned to each programming tuner and the control channel tuner.

After this division of the frequency band to be searched, the programming tuners, under the control of the processor, parse through the frequencies assigned to each (405). The programming tuners do not provide tuned signals to the processor for a determination as to whether the signal is the control channel. Rather, the tuners merely note at which frequencies strong signals are received, a spectrum analysis.

Demodulation is not required or important. This approach places fewer demands on the processor.

The frequencies carrying active or strong signals are identified to the processor by the programming tuners (406). The processor then controls the control channel tuner to tune the frequencies carrying active signals as identified by the spectrum scan performed by the programming tuners (407). Hopefully, one of the active signals identified and tuned with the control channel tuner will prove to be the control channel (206). If so, the control channel tuner is locked to the control channel which is received (208) to allow the set-top unit to achieve full functionality.

In this way, the time required to find the control channel can be reduced because the control channel tuner only tunes and samples frequencies carrying active signals as identified by the programming tuner(s). No time is wasted by tuning all frequencies, active and inactive, with the control channel tuner.

If, for whatever reason, the search of the active frequencies identified by the programming tuners fails to locate the control channel, the set-top unit can default to the conventional method of tuning each available frequency in the band with the control channel tuner looking for the control frequency (408). Eventually, the control channel is identified (206) and locked (208).

As will be appreciated by those skilled in the art, the present invention also encompasses the computer-readable instructions required to make the processor (104) of the set-top unit (100) operate in the manner described above. Specifically, the present invention includes computer-readable instructions which, when executed by the processor (104), cause the processor (104) to control the control channel and programming tuners (101–103) to work simultaneously (as outlined in FIGS. 3 and 4) to more quickly locate the control channel. As used herein, the term "computer-readable" instructions includes software written in any language and at any level (e.g., object code, source code, etc.) as well as firmware, application specific integrated circuits (ASICs) and the like.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A set-top unit for connection to a cable television system comprising:
    a control channel tuner;
    at least one programming tuner; and
    a processor for controlling said tuners;
    wherein said processor controls said at least one programming tuner to scan a frequency band to locate a control channel;
    wherein said processor controls said at least one programming tuner to tune frequencies in said frequency band and identify frequencies carrying an active signal; and
    wherein said processor controls said control channel tuner to tune said frequencies carrying an active signal to locate said control channel.

2. The set-top unit of claim 1, wherein, if said control channel is not found at one of said frequencies carrying an active signal, said processor controls said control channel tuner to tune frequencies in said frequency band until said control channel is located.

3. The set-top unit of claim 1, wherein:
    said at least one programming tuner comprises two programming tuners; and
    said processor divides said frequency band between said two programming tuners and controls said two programming tuners to tune frequencies in different portions of said frequency band to identify frequencies carrying an active signal.

4. A set-top unit for connection to a cable television system comprising:
    a control channel tuner;
    at least one programming tuner; and
    a processor for controlling said tuners;
    wherein said processor controls said at least one programming tuner to scan a frequency band to locate a control channel;
    wherein said processor divides said frequency band among said control channel tuner and said at least one programming tuner, and controls each said tuner to search a different portion of said frequency band for said control channel.

5. The set-top unit of claim 4, wherein:
    said at least one programming tuner comprises first and second programming tuners; and
    said processor divides said frequency band among said control channel tuner and said first and second programming tuners, and control each said tuner to search a different portion of said frequency band for said control channel.

6. The set-top unit of claim 4, wherein each tuner provides a signal at each tuned frequency to said processor for a determination as to whether said signal is said control channel.

7. A method for acquiring a control channel of a cable television system with a set-top unit connected to said cable television system by controlling at least one programming tuner of said set-top unit to scan a frequency band to locate said control channel, said method comprising:
    controlling said at least one programming tuner to tune frequencies in said frequency band and identify frequencies carrying an active signal; and
    controlling a control channel tuner to tune said frequencies carrying an active signal to locate said control channel.

8. The method of claim 7, wherein, if said control channel is not found at one of said frequencies carrying an active signal, said method further comprises controlling a control channel tuner to tune frequencies in said frequency band until said control channel is located.

9. The method of claim 8, wherein said at least one programming tuner comprises two programming tuners; and said method further comprises dividing said frequency band between said two programming tuners and controlling said two programming tuners to tune frequencies in different portions of said frequency band to identify frequencies carrying an active signal.

10. A method for acquiring a control channel of a cable television system with a set-top unit connected to said cable television system by controlling at least one programming tuner of said set-top unit to scan a frequency band to locate said control channel, said method comprising:

dividing said frequency band among a control channel tuner and said at least one programming tuner; and controlling each said tuner to search a different portion of said frequency band for said control channel.

11. The method of claim 10, wherein said at least one programming tuner comprises first and second programming tuners; and said method further comprises:

dividing said frequency band among said control channel tuner and said first and second programming tuners; and controlling each said tuner to search a different portion of said frequency band for said control channel.

12. The method of claim 11, further comprising:

providing a signal from each tuner at each tuned frequency; and determining whether said provided signal is said control channel.

13. A set-top unit for connection to a cable television system comprising:

first tuning means for tuning a control channel;

second tuning means for tuning a frequency in a composite signal from said cable television system independently of said first tuning means; and processing means for controlling said tuning means;

wherein said processing means controls said second tuning means to scan a frequency band to locate said control channel;

wherein said processing means controls said second tuning means to tune frequencies in said frequency band and identify frequencies carrying an active signal; and wherein said processing means controls said first tuning means to tune said frequencies carrying an active signal to locate said control channel.

14. A set-top unit for connection to a cable television system comprising:

first tuning means for tuning a control channel;

second tuning means for tuning a frequency in a composite signal from said cable television system independently of said first tuning means; and processing means for controlling said tuning means;

wherein said processing means controls said second tuning means to scan a frequency band to locate said control channel; and wherein said processing means divides said frequency band among said first and second tuning means, and controls each said tuning means to search a different portion of said frequency band for said control channel.

15. Computer-readable instructions stored in a medium for recording computer-readable instructions in a set-top unit for connection to a cable television system, the instructions causing a processor of said set-top unit to control at least one programming tuner of said set-top unit to scan a frequency band to locate said control channel;

wherein said instructions further cause said processor to:

control said at least one programming tuner to tune frequencies in said frequency band and identify frequencies carrying an active signal; and control a control channel tuner to tune said frequencies carrying an active signal to locate said control channel.

16. Computer-readable instructions stored in a medium for recording computer-readable instructions in a set-top unit for connection to a cable television system, the instructions causing a processor of said set-top unit to control at least one programming tuner of said set-top unit to scan a frequency band to locate said control channel;

wherein said instructions further cause said processor to:

divide said frequency band among a control channel tuner and said at least one programming tuner; and control each said tuner to search a different portion of said frequency band for said control channel.

17. A set-top unit for connection to a cable television system comprising:

a control channel tuner;

at least one programming tuner; and a processor for controlling both said tuners;

wherein said processor is configured to concurrently control both said control channel tuner and said at least one programming tuner to scan a frequency band to locate a control channel.

18. The set-top unit of claim 17, further comprising a memory unit, wherein said processor, before controlling said tuners to scan a frequency band to locate a control channel, checks said memory unit for a last known frequency at which said control channel was broadcast.

19. The set-top unit of claim 17, wherein:

said processor is configured to control said at least one programming tuner to tune frequencies in said frequency band and identify frequencies carrying an active signal; and said processor is configured to control said control channel tuner to tune said frequencies carrying an active signal to locate said control channel.

20. The set-top unit of claim 17, wherein, if said control channel is not found at one of said frequencies carrying an active signal, said processor controls said control charmer tuner to tune frequencies in said frequency band until said control channel is located.

21. The set-top unit of claim 17, wherein said processor divides said frequency band among said control channel tuner and said at least one programming tuner, and controls each said tuner to search a different portion of said frequency band for said control channel.

22. A set-top unit for connection to a cable television system comprising:

a control channel tuner;

two or more programming tuners; and a processor for controlling said tuners;

wherein said processor is configured to concurrently control said programming tuners to scan a frequency band to locate a control channel.

23. The set-top unit of claim 22, wherein said processor is configured to further control said control channel tuner to scan said frequency band to locate said control channel, wherein said control channel tuner and said programming tuners concurrently scan different portions of said frequency band to locate said control channel.

* * * * *

UNITED STATES PATENT AND TRADEMARK OFFICE
CERTIFICATE OF CORRECTION

PATENT NO. : 7,100,194 B1
APPLICATION NO. : 09/711325
DATED : August 29, 2006
INVENTOR(S) : Robert Allen Unger It is certified that error appears in the above-identified patent and that said Letters Patent is hereby corrected as shown below:

Column 10, Line 34, Claim 20, change "The set-top unit of claim 17" to -- The set-top unit of claim 19 --

Signed and Sealed this

Eleventh Day of March, 2008

JON W. DUDAS
*Director of the United States Patent and Trademark Office*